United States Patent [19]
von Greyerz

[11] Patent Number: 5,059,163
[45] Date of Patent: Oct. 22, 1991

[54] TRANS-PLANETARY MECHANICAL TORQUE IMPELLER

[76] Inventor: John W. von Greyerz, 643 Sun Ray Ct., Boynton Beach, Fla. 33436

[21] Appl. No.: 597,168

[22] Filed: Oct. 15, 1990

[51] Int. Cl.$^5$ .............................................. F16H 3/68
[52] U.S. Cl. ................................. 475/296; 475/330; 74/724
[58] Field of Search ............... 475/32, 73, 77, 218, 475/219, 269, 296, 330; 74/427, 724, 730.1

[56] References Cited

U.S. PATENT DOCUMENTS

| | | | |
|---|---|---|---|
| 1,998,891 | 5/1933 | Benson | 475/296 |
| 2,066,758 | 1/1937 | Bassoff | 475/296 |
| 2,137,778 | 11/1938 | McCullough | 475/296 |
| 2,209,367 | 2/1939 | Watson | 475/330 X |
| 2,985,036 | 3/1954 | Forster | 475/218 X |
| 3,298,251 | 1/1967 | Moss | 475/77 |
| 3,578,117 | 5/1971 | Ahlen | 74/731.1 X |
| 3,678,786 | 7/1972 | Szekely | 74/724 X |
| 3,901,096 | 8/1975 | Woody | 74/730.1 X |
| 4,016,778 | 4/1977 | Von Greyerz | 475/32 |
| 4,016,779 | 4/1977 | Von Greyerz | 74/724 |

FOREIGN PATENT DOCUMENTS

| | | | |
|---|---|---|---|
| 0866926 | 9/1941 | France | 475/330 |
| 2136069 | 9/1984 | United Kingdom | 475/330 |

Primary Examiner—Allan D. Herrmann
Assistant Examiner—Daniel Wittels
Attorney, Agent, or Firm—Jones, Tullar & Cooper

[57] ABSTRACT

This disclosure is directed to a new concept in torque-type propulsion through a totally mechanical, self governing, low to high gear, trans-planetary torque impeller capable of infinitely and automatically matching the input shaft or motor power output capability to the output shaft load.

10 Claims, 5 Drawing Sheets

TRANS-PLANETARY MECHANICAL TORQUE IMPELLER

FIELD OF THE INVENTION

The present invention is directed generally to a torque impeller or mechanical torque converter. More particularly, the present invention is directed to a trans-planetary mechanical torque impeller. Most specifically, the present invention is directed to a trans-planetary mechanical torque impeller having various gear ratios with no gear case attachments. The torque impeller of the present invention can be used in a variety of operational devices and vehicles which require variable speed and propulsion.

DESCRIPTION OF THE PRIOR ART

It is generally well known in the field of power transmission and conversion that transmissions having multiple gear sets, clutches and shifting linkages are required to provide a high torque output at low speed for start-up operations of any number of devices. Prior examples of these transmissions, especially those with torque converters have been large, expensive units and have typically required complex shifting assemblies. It has been the conventional theory in the prior art that it was not possible to have a transmission with various gear ratios without having at least temporary gear case attachments.

The trans-planetary mechanical torque impeller of the present invention overcomes the deficiencies of the generally known devices and is a substantial improvement over the prior art solutions.

SUMMARY OF THE INVENTION

It is an object of the present invention to provide a torque impeller.

Another object of the present invention is to provide a transplanetary mechanical torque impeller.

A further object of the present invention is to provide a trans-planetary torque impeller having infinite gear ratios with no gear case attachments.

As will be discussed in greater detail in the description of the preferred embodiment which is set forth subsequently, the torque impeller in accordance with the present invention, since it is a torque impeller and one of the key elements in a drive train, utilizes the output shaft load itself for a power take-off and self help to infinitely drive the totally mechanical torque impeller. The torque impeller has no bands, no pumps, no clutches, no gear case attachments and no gear shifting is required. This torque impeller can be used in series with any type of motor to infinitely drive such units as conveyors, elevators, carwashes and some variable speed machinery plus every type of moving land based vehicle from bicycles or motorcycles to the largest trucks or trains requiring added power at start-up plus an increase in speed consistent with the designed input power and variable load conditions.

An input shaft is used to drive a primary worm gear which causes a control worm gear to govern rotation of a primary annulus gear. This primary annulus gear being indirectly connected to the output shaft, serves as a base gear and meshes with planetary gears that drive a secondary annulus gear which in turn is connected to and operates the output shaft.

In lieu of temporary bands or clutch type gear housing attachments to obtain low gears at start-up, the input shaft being driven by another source, uses the output shaft load itself to assist as a power take-off and self help to drive coupled unmatched planetary pinion gears that, when revolved within the associated unmatched annulus gears, the circumferential difference in gear size is then applied rotationally to the output shaft for each input shaft rotation, resulting in a designed and positive low gear ratio at start-up thus applying torque to said output shaft, all of which is operable in either rotary direction. A wide range of start-up gear ratios, such as 10 or 12 to 1 down to approximately 100 to 1, can be made available by small size changes in the unmatched, coupled, planetary gears and with two torque impellers connected in series, the ratios can be increased down to probably unusable ratios such as 5000 to 1, all of which continually seeks a 1 to 1 ratio or the optimum ratio obtainable. When the torque impeller or impellers of this invention have attained a 1 to 1 ratio, the entire internal unit or units revolve as a solid. It will permit smaller motors to be used without sacrificing power, especially at start-up, and will greatly enhance the usage of battery or electric power operated vehicles thereby substantially reducing fossil fuel usage for a cleaner environment and at far less cost.

The trans-planetary mechanical torque impeller of the present invention is infinitely variable and provides high starting torque together with high speed direct drive in a manner which is a substantial advance in the art.

BRIEF DESCRIPTION OF THE DRAWINGS

While the novel features of the trans-planetary mechanical torque impeller of the present invention are set forth with particularity in the appended claims, a full and complete understanding of the invention may be had by referring to the description of the preferred embodiment, as is set forth subsequently, and as illustrated in the accompanying drawings, in which:

DESCRIPTION OF THE PREFERRED EMBODIMENT

Figure 1:
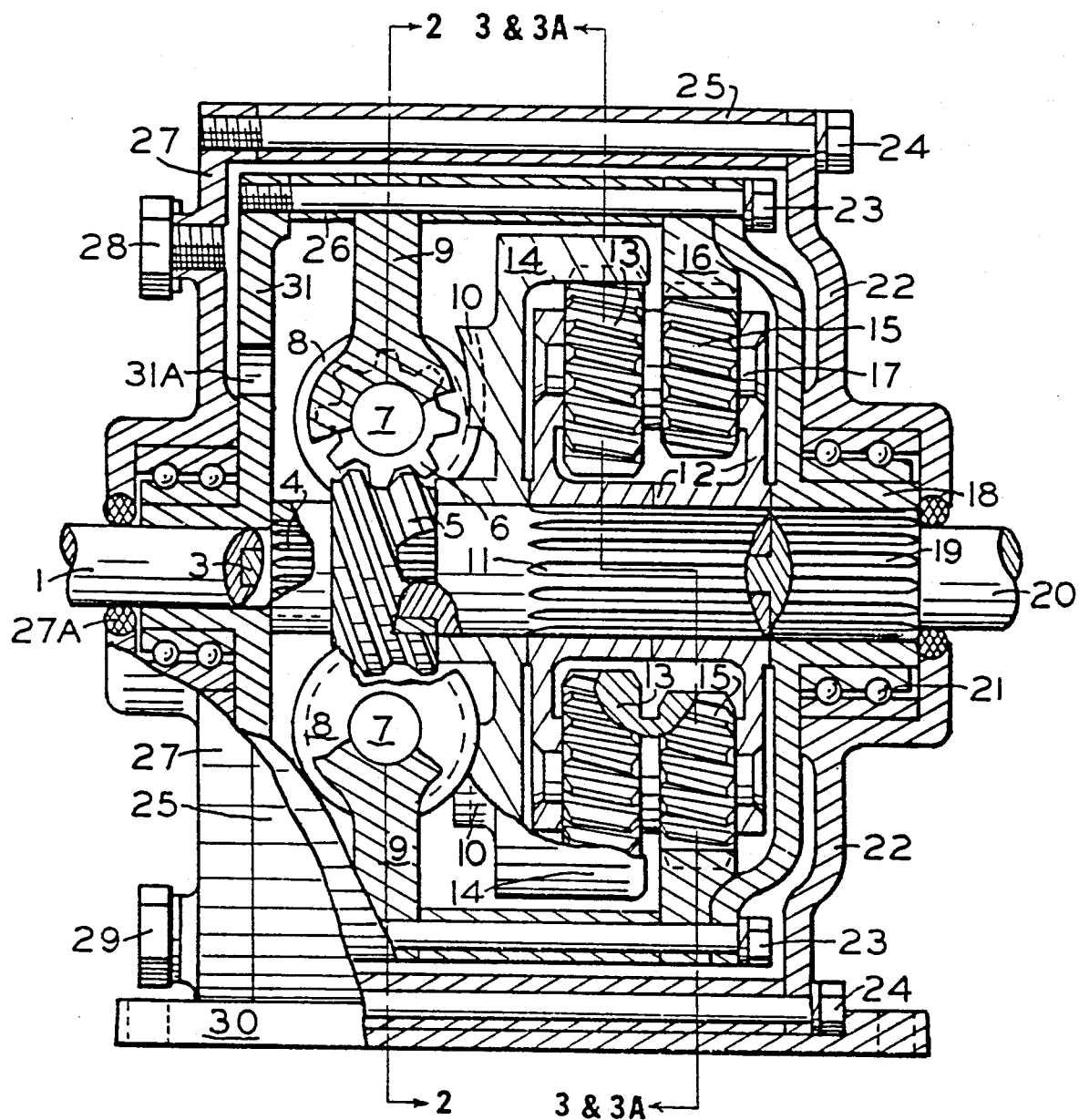
FIG. 1 is a side view of the present invention in a simple but functional housing, such as would normally be driven by an electric motor with a specific variable speed rotary function to perform requiring added power at start up.
Figure 2:
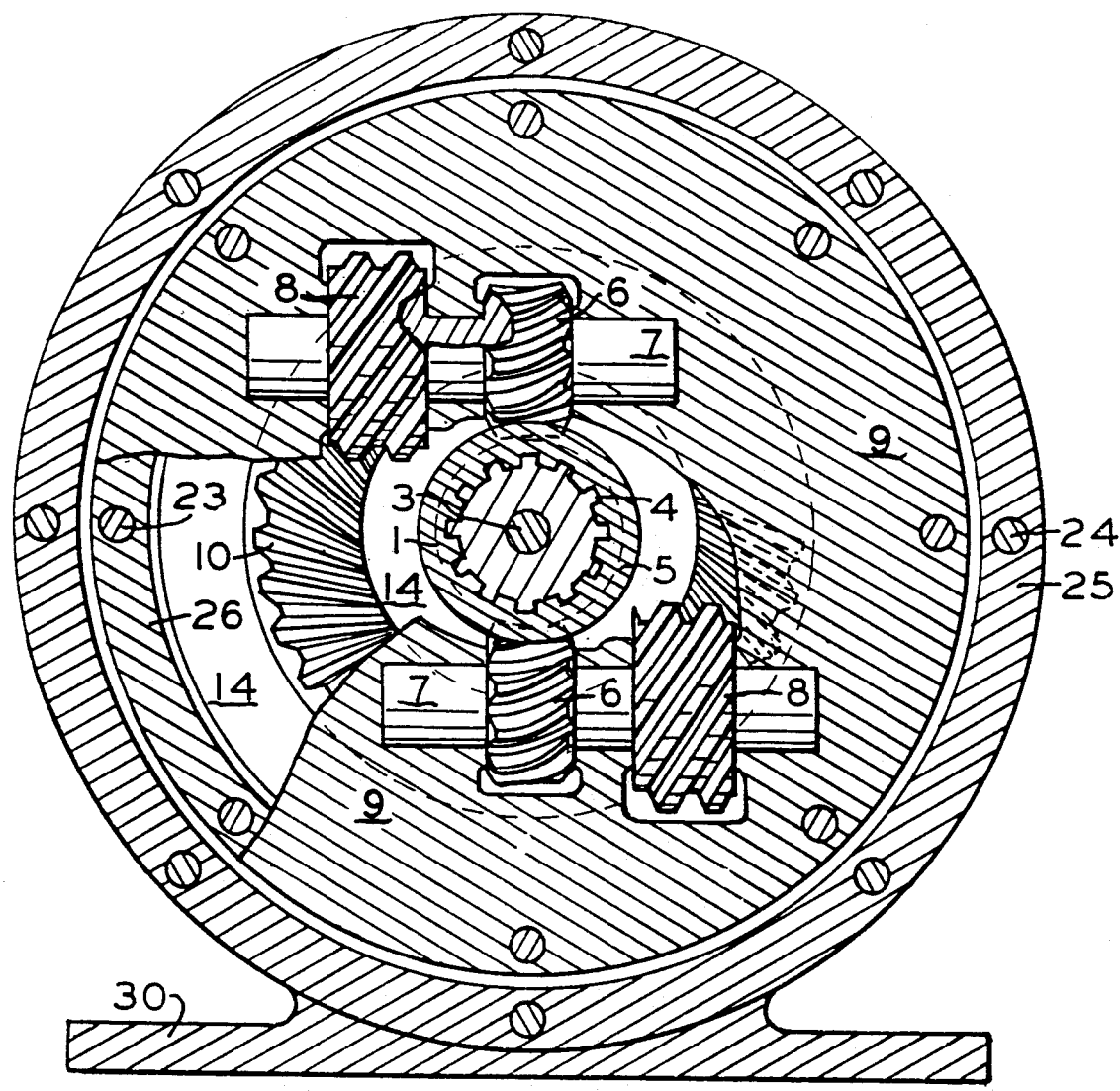
FIG. 2 is a sectional front end view taken along line 2—2 of FIG. 1.

Referring initially to FIG. 1, there may be seen a transplanetary mechanical torque impeller in accordance with the present invention. The torque impeller consists mainly of two revolving and working units. As will be noted from FIG. 1, input shaft 1 having splines 4 and 11 is driven by a power source and stabilized by the output shaft extension stabilizer 3. Input shaft 1 being coupled to primary worm gear 5 thru splines 4 in the forward unit, when rotated will cause associated pinion worm gear 6 to rotate on it is axle 7 which then revolves secondary worm gear 8. Pinion worm gear 6 has a total of 8 gear teeth in this example and primary worm gear 5 has double threads that when revolved 4 times will cause pinion worm gear 6 to make one complete revolution for a 4 to 1 ratio. Pinion worm gear 6 and secondary worm gear 8 share a common axle 7 and are shown as being cast in one unit. Secondary worm gear 8 which has quadruple threads, intermeshes with control worm gear 10 which is made to theoretically revolve in the opposite direction than input shaft 1 at start-up, however, as output shaft 20 begins to revolve, control worm gear 10 and associated primary annulus gear 14 follows progressively closer behind. Secondary worm gear 8 and associated worm gear 10 are quadruple threaded which gives these two gears an 8 to 1 ratio, thereby with primary worm gear 5 and associated pinion worm gear 6 having a 4 to 1 ratio, an over-all input shaft 1 to control worm gear 10 ratio at the point of start-up would be 32 to 1 for this example.

Worm gears 5, 6, 8 and 10 can be made different sizes with quadruple, double or single threads in any combination as necessary to obtain various ratios. It must be noted that secondary worm gear 8 theoretically revolves control worm gear 10 and associated annulus gear 14 an equal number of revolutions in reverse as compared to the forward revolutions of annulus gear 16 at the point of start-up and under load which requires a combination of worm gears, or a suitable substitute, to achieve this condition. With worm carrier 9 which supports axle 7 revolving forward at start-up, annulus gear 14 will remain stationary momentarily or until such time that annulus gear 16 rotates at a rate faster than the designed lag between the primary gears and the secondary gears which is explained in detail in subsequent paragraphs.

As for example, in the above described, the input shaft 1 to control worm gear 10 ratio is 32 to 1. The ratio must be matched in the planetary-annulus gears 13 thru 16 so that output shaft 20 revolves 1 revolution while planetary carrier 12 is revolved 32 revolutions at start-up. This will be covered in greater detail in subsequent paragraphs. The above described action basically covers the first or front input unit which controls the action of the second or main driving unit.

FIG. 1 thru FIG. 5 show the use of two primary planetary pinion gears 13 and two secondary planetary pinion gears 15 for improved ease of illustration, however, a plurality of these pinion gears may be used as required. As input shaft 1 is revolved, planetary carrier 12 is also revolved accordingly through planetary carrier spline thereby planetarily revolving unmatched, (different size than attached secondary gears), primary planetary pinion gears 13 and associated secondary planetary pinion gears 15 within unmatched annulus gears 14 and 16. Planetary pinion gears 13 and 15 are attached or splined or made into one unit so that both gears revolve in unison on their common axles 17. Primary planetary pinion gears 13, however, are slightly larger in size than secondary planetary pinion gears 15. The gear teeth of primary planetary gears 13 intermesh with the gear teeth of primary annulus gear 14. As planetary carrier 12 and associated gears 13 and 15 are revolved planetarily at start-up, planetary gears 13 and 15 revolve in the opposite direction on their own axles 17. The geared down thrust required for secondary planetary pinion gear 15 to pull annulus gear 16 is then also applied to annulus gear 14 thru primary planetary pinion gear 13. The feedback thrust applied to annulus gear 14 is also applied to output shaft 20 thru worm gears 10 and 8 plus worm carrier 9 and inner housing 26. Annulus gear 14 acts as a base or fulcrum to help drive secondary planetary gear 15 which pulls and intermesh the gear teeth of secondary annulus gear 16. All gears performing the same function must of course be the same size.

Figure 3:
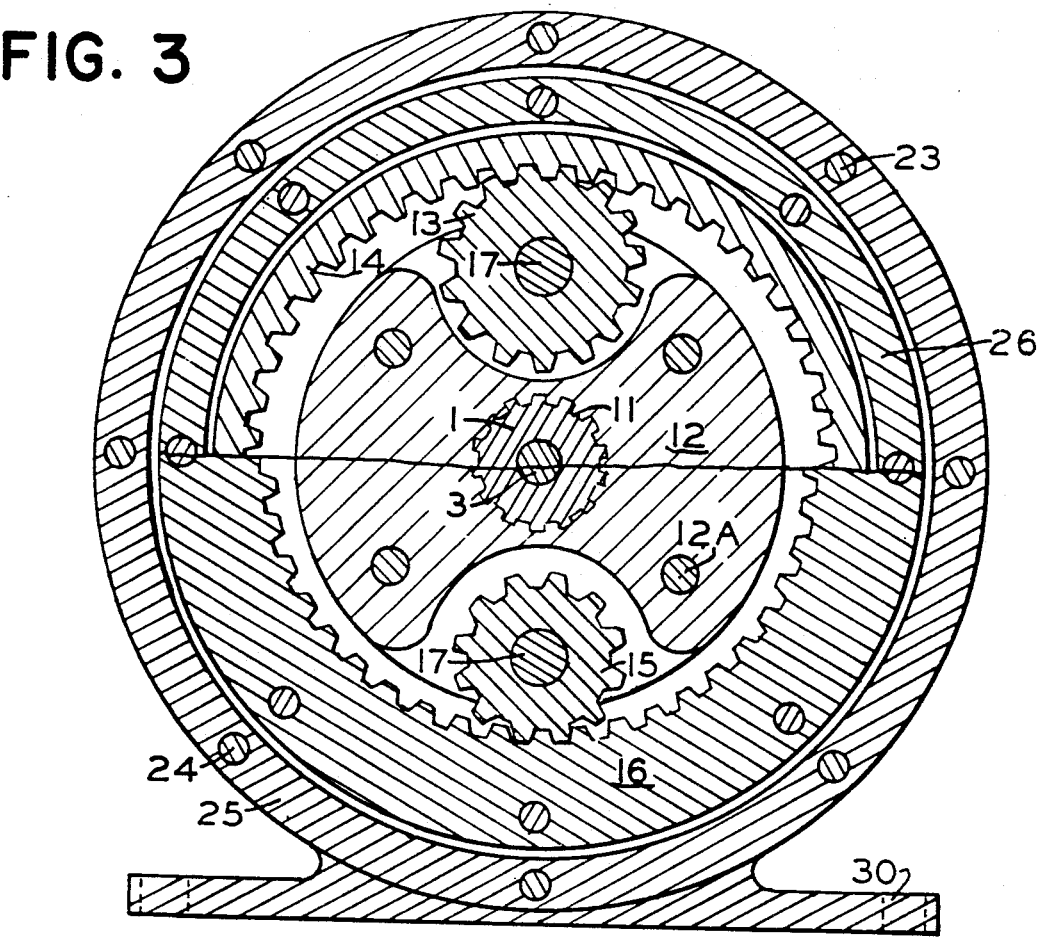
FIG. 3 is a sectional end view along line 3—3 of FIG. 1.
Figure 3A:
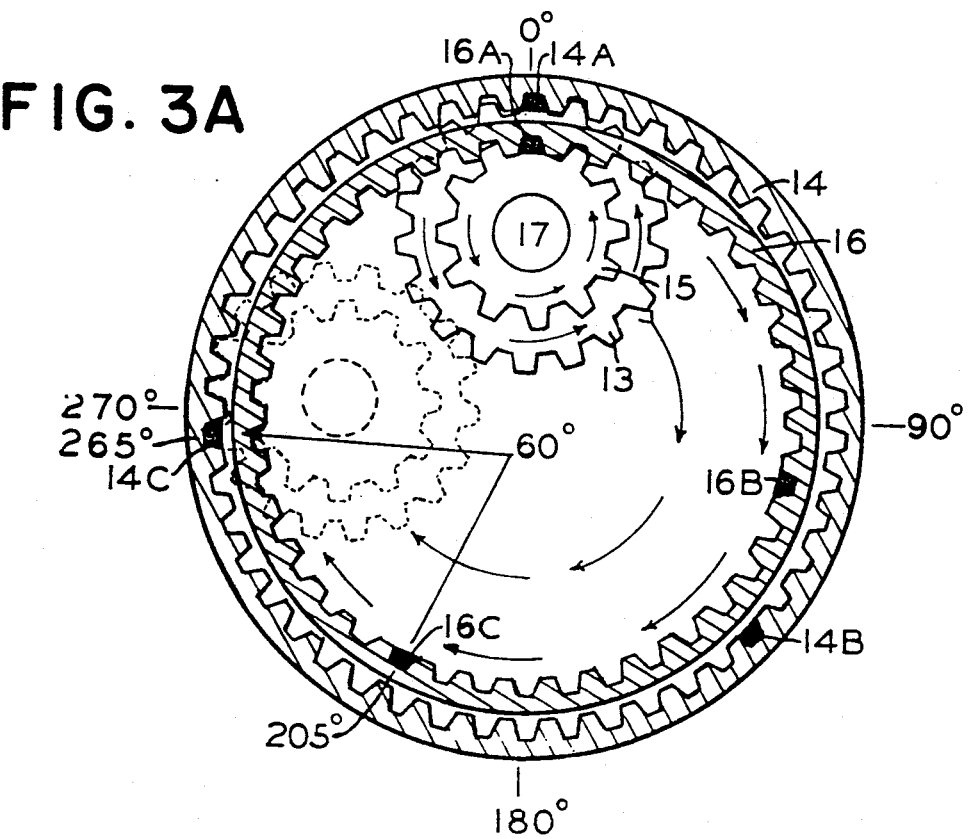
FIG. 3A a view taken along line 3A—3A to assist in understanding the key functional description and basic principal of operation detailing how slow, geared down rotation is achieved at start up through rotation of coupled, unmatched planetary gears within associated annulus gears.

At start-ups, planetary gears 13 and 15 may revolve rather rapidly on their own axles. The power source could be an electric motor revolving 6000 RPM or more or it could be a person pedaling a bicycle or it could be a vehicle at various speeds. Primary and secondary planetary pinion gears 13 and 15 being joined together but of a different diameter, revolve within primary and secondary annulus gears 14 and 16 while applying torque on a graduated scale to both annulus gears but primarily to annulus gear 16. The difference in size between pinion gears 13 and 15 will dictate the start-up or low gear ratio and must rotate annulus gear 16 more rapidly at start-up than annulus gear 14 which is held almost stationary at that point. If planetary gears 13 and 15 were of equal size they would of course revolve aimlessly within annulus gears 14 and 16. This difference in size makes secondary pinion gears 15 continually pull annulus gear 16 with it until a 1 to 1 ratio has been achieved. The slowed down action of annulus gear 14 is controlled by worm gear 10. As shown in FIG. 1, 3 and 3A, primary planetary gears 13 and associated primary annulus gear 14 are slightly larger than secondary planetary gears 15 and associated secondary annulus gear 16. For simplicity and better understanding, FIG. 3A illustrates in detail the gear action on two single primary and secondary planet pinion gears 13 and 15 that take place at start-up. As previously stated, planetary gears 13 and 15 are of a different size, however, they are and revolve as one unit. Note the solid black gear teeth 14A and 16A at 0° in FIG. 3A. As planetary carrier 12, not shown, and associated planetary gears 13 are rotated clockwise as a unit within stationary annulus gear 14, planetary gears 13 revolve counter-clockwise axially and will rotate one full revolution from point 14A to 14B and another axial revolution brings it to point 14C. normally stop at point 16C, however, since planetary gears 13 and 15 are attached to each other, it must pull annulus gear 16 continually with it resulting in an additional distance in this example from point 16C to point 14C for a total gain of 60° or 16.6% of one full revolution. This described action is the key function to this invention. The constant pull on annulus gear 16 as well as annulus gear 14 at an infinite ratio is basically what drives or pulls output shaft 20 and the ratio diminishes as the load decreases and the speed increases.

The example in FIG. 3A was designed for ease of understanding and would indicate that a 4.42 to 1 ratio exists. This would be difficult to achieve in this case due to the worm gear limitations, therefore, it is shown as an example only.

If for an example, the torque impeller was designed to deliver a 32 to 1 ratio, certain design factors would need to be taken into account. At the point of start-up, annulus gear 16 must revolve approximately 11.25° per revolution, more than annulus gear 14. This will require secondary annulus gear 16 to be approximately 0.03125% smaller in diameter than primary annulus gear 14 and this would also apply to associated planetary gears 13 and 15. While annulus gear 16 makes one revolution, associated worm carrier 9 also makes a revolution since they are common with inner housing 26. While annulus gear 16 and associated worm carrier 9 make the first revolution at start-up, annulus gear 14 and associated control worm gear 10 will in effect remain stationary. The worm gears must also be designed to produce a 32 to 1 input shaft 1 to worm gear 10 and annulus gear 14 ratio. Basically while worm carrier 9 is making the first revolution, annulus gear 14 remains stationary due to the reverse action of the worm gears. This will allow annulus gear 16 to move forward one revolution due to the 32 to 1 ratio between it and secondary planet pinion gears 15 versus movement of primary planet pinion gears 14 which are attempting to revolve output shaft 20 on a one on one basis thru worm gears 10 and 8 plus worm carrier 9, inner housing 26 and output shaft end plate 18. The above example will, for each planetary carrier 12 revolution at start-up, deliver a full 11.25° difference between primary gears 13 and 14 versus secondary gears 15 and 16.

Basically if primary planet pinion gears 13 were sized just large enough to cause smaller secondary planet pinion gears 15 to advance 3.6° for each planetary carrier 12 revolution, a 100 to 1 ratio at start-up would then be achieved. Under this condition, worm gears 5, 6, 8 and 10 would also have to be sized to produce input shaft 1 to worm gear 10 plus annulus gear 14 ratio of 100 to 1 at start-up. The smaller the difference in size between the primary and the secondary planetary gears, plus associated annulus gears, the greater the gear ratio. As shown above, a 3.6° or 0.1% circumferential difference in size between the primary and secondary gear will require 100 planetary carrier 12 revolutions at start-up to be made while annulus gear 16 and output shaft 20 make one revolution. In contrast, with a 15° or 0.042% circumferential difference between primary and secondary gears, a 24 to 1 start-up ratio would result. The lower the gear ratio the more critical it becomes for the worm gears to be sized properly to keep both units in synchronization and to take advantage of each rotational planetary versus secondary gain. Without the proper amount of reverse worm gear action, annulus gear 14 will be out of synchronization with annulus gear 16 or vice versa. Insufficient reverse gear action could result in changing the designed start-up low gear ratio to a higher undesirable gear ratio, as for example, if annulus gear 14 were allowed to run too rapidly at start-up. Also if annulus gear 16 is allowed to over-run annulus gear 14, more than the designed limits, gear damage could result. To offset such a condition, a restraining clutch would need to be installed between worm gear 10 and annulus gear 14 or between worm gear 9 and inner housing 26 to protect the gears.

Primary planet pinion gears 13 need slowed down annulus gear 14 as a base, fulcrum or pivot gear at start-up to drive secondary planet pinion gears 15 and pull annulus gear 16. As worm carrier 9 and associated parts begin to revolve, annulus gear 14 will also begin to revolve, but somewhat slower due to the reverse or slow down action still being applied. The more rapidly worm carrier 9 revolves the more pinion worm gears 6 revolutions begin to diminish accordingly thereby reducing the reverse or slow down action in worm gear 10. The reverse action applied to worm gear 10 during acceleration holds annulus gear 14 to a slower speed than annulus gear 16, but allows it to progressively revolve at a faster rate as the load diminishes and it strives to attain a 1 to 1 ratio or a ratio that will match the motor to the load. The power required to drive annulus gear 16 is in effect applied to annulus gear 14 and fed back to output shaft 20 via worm gears 10 and 8 plus worm carrier 9. The load on output shaft 20 is utilized thru said gears to self help or feedback drive the output shaft.

If the load on output shaft 20 is such that the motor powering the torque impeller is incapable of gaining a higher ratio, for example 10 to 1, the motor and torque impeller will continue in that mode until such time that the load decreases or the motor RPM is increased which will then increase the input power plus increasing the planetary gear speed which will automatically place it into a lower gear ratio temporarily.

The power required to drive the worm gears and especially worm gear 10 is negligible considering that in this case the ratio is 32 to 1 and that the bulk of the thrust from planet gears 13, is applied to worm carrier 9, not the worm gears as such. In cases where the ratio is in the range of 10 or 12 to 1, it requires more power to drive the worm gears than it does when the ratio is in the area of 70 or 80 to 1.

One of the key factors with this invention is that it will operate equally well in either rotary direction. It can also operate on lubricating oils having various viscosities. For certain small operational devices, it should be understood that fiber gears such as nylon, polypropylene, polytetrafluoroethylene (teflon) glass fiber, reinforced thermosetting or thermoplastic resinous materials may be employed to constitute any of the gears in the torque impeller. It can also operate in a motor vehicle having a clutch in lieu of a torque converter preceding the torque impeller and operate very well in stop and go traffic. Simply braking the vehicle will place the torque impeller in a lower gear, operable at 1.5 or 2 MPH with a 32 to 1 ratio impeller and with the motor at idling speed plus fully engaged clutch.

Table 1 below gives an indication of the relative gear speeds in a typical start-up example. Considerable torque can be applied to output shaft 20 when necessary at start-ups or for passing other vehicles. As for example, on line 5 it shows output shaft 20 revolving 300 RPM, 25+− MPH, with a 5 to 1 ratio. If the input shaft 1 RPM were suddenly increased to 6000 RPM, a 20 to 1 ratio would then apply. No gears are shifted, no bands applied. The increased input shaft speed automatically causes it to go into a lower gear ratio from which it will once again strive to reach a 1 to 1 ratio and will do it infinitely.

TABLE 1

RELATIVE GEAR SPEEDS - START-UP GEAR RATIO 32 TO 1

| RPM INPUT SHAFT 1 CARRIER 12 | RPM ANNULUS GEAR 14 | RPM ANNULUS GEAR 16 & OUTPUT SHAFT 20 | RATIO INPUT SHAFT 1 TO OUTPUT SHAFT 20 |
|---|---|---|---|
| 600 | 0 | 18.75 | 32 to 1 |
| 800 | 16 | 40 | 20 to 1 |
| 1000 | 37 | 66.6 | 15 to 1 |
| 2000 | 144 | 200 | 10 to 1 |
| 1500 | 262 | 300 | 5 to 1 |
| 1000 | 484 | 500 | 2 to 1 |
| 1000 | 742 | 750 | 1.3 to 1 |
| 1000 | 1000 | 1000 | 1 to 1 |

A torque impeller of this invention having for example a start-up ratio of 32 to 1 and a moderate sized load attached to output shaft 20 and being driven by a motor having ample power connected to input shaft 1, it would be expected to rapidly seek and attain a 1 to 1 ratio. Under a 1 to 1 condition the entire internal unit would revolve as a solid. Due to centrifugal force, no lock-up feature should be necessary under this condition FIG. illustrates a torque impeller that may be used in conjunction with an electric motor that could drive a particular type of machinery requiring additional power at start-up. It eliminates the need for a repulsion-induction type electric motor and it would require less electric power because a smaller motor could be used in many cases. The electric motor housing and the torque impeller housing could be combined into one housing providing an internal divider were used to fully retain the lubricant in the torque impeller unit.

Housing 26 and associated base 30 shown in FIG. 1 can of course be changed completely and tailored to suit any designed function. It can also be eliminated entirely if necessary, however, the inner housing would have to be designed to contain the needed lubricant. For example, if outer housing 25 and base 30 were eliminated, a torque impeller of the proper size could be inserted in an open drive shaft on a stick-shift vehicle. The vehicle could be placed in drive or high gear and left there for all forward driving. Of course the clutch would need to be used in its conventional manner at all stops. If for example, the torque impeller were designed with a 15 to 1 start-up ratio, along with the usual built in differential ratio it would result in a motor to drive wheel ratio of approximately 45 or more to 1. The torque impeller itself would rapidly seek and attain a 1 to 1 ratio under average driving conditions.

Figure 4:
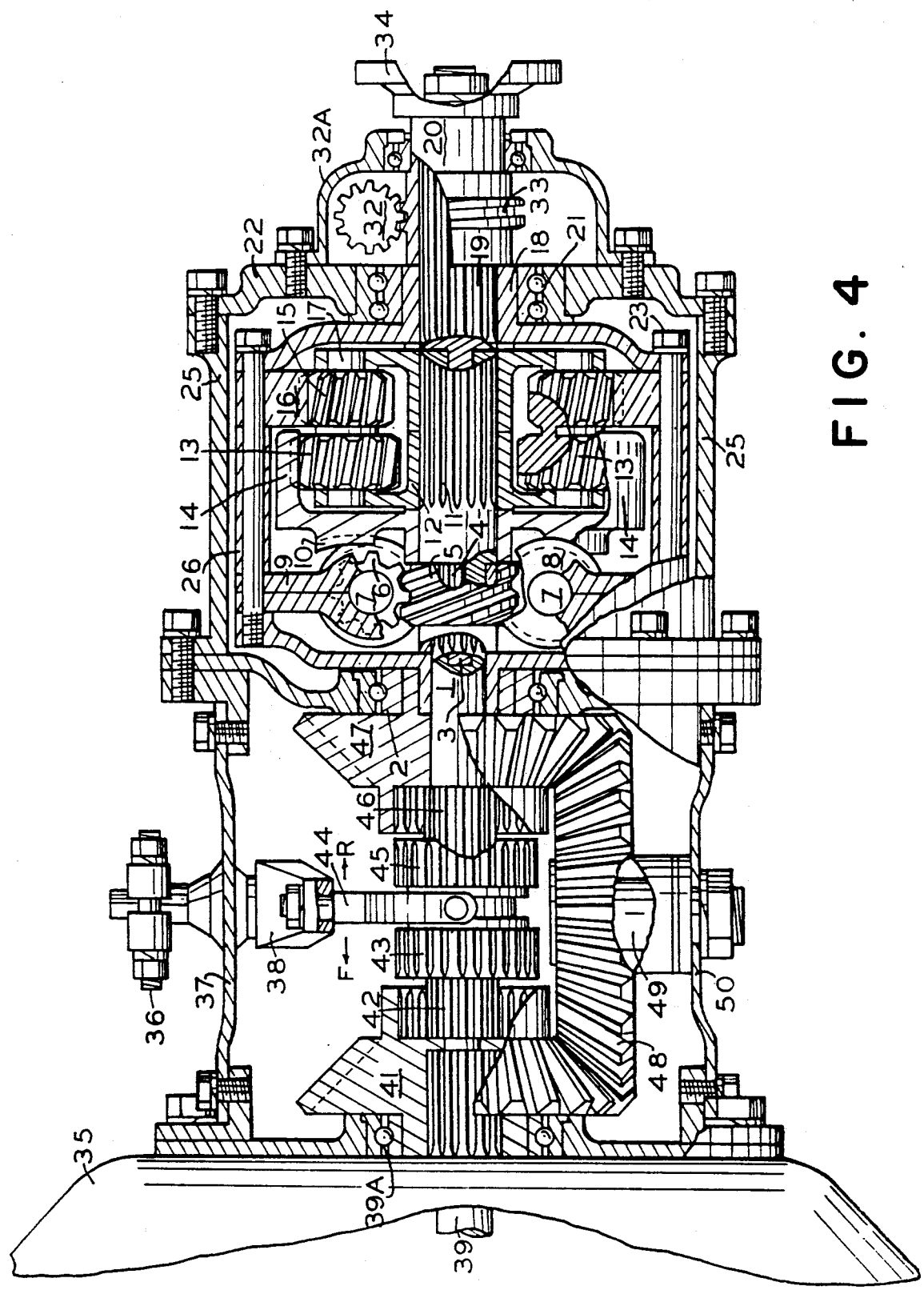
FIG. 4 is an operational side view illustrating the use of a single torque impeller in a transmission.

FIG. 4 illustrates how a torque impeller of this invention can be used in a simple but effective vehicle transmission. Housing 35 represents a manually operated clutch or torque converter. In either case, shaft 39 and forward coupling gear 41 is the main input driving force. When forward outer spline 43 is engaged with the spline of forward coupling gear 41 plus forward spline 42, output shaft 20 is made to revolve in a forward rotation. Reverse pinion gear 48 and reverse coupling gear 47 rotate neutrally under this condition. Through shifter fork 44, outer spline 45 is made to mesh with reverse spline 46 plus reverse coupling gear 47 which always revolves in reverse, input shaft 1 and entire internal impeller will revolve in reverse under this condition.

The forward, neutral and reverse gear mechanism in FIG. 4 is shown as an example only. Any type of shifting mechanism would be compatible with the torque impeller of this invention. A torque impeller equipped transmission such as FIG. 4 would allow for example, any differential ratio such as 0.5 to 1 to be used which would provide full time over-drive. Instead of relying on the differential for a lower motor to drive wheel ratio, the torque impeller will seek the proper motor to drive wheel ratio at all times and under all conditions such as when pulling a boat or trailer. It will allow a smaller motor to be used without sacrificing power and will conserve considerable fuel.

Figure 5:
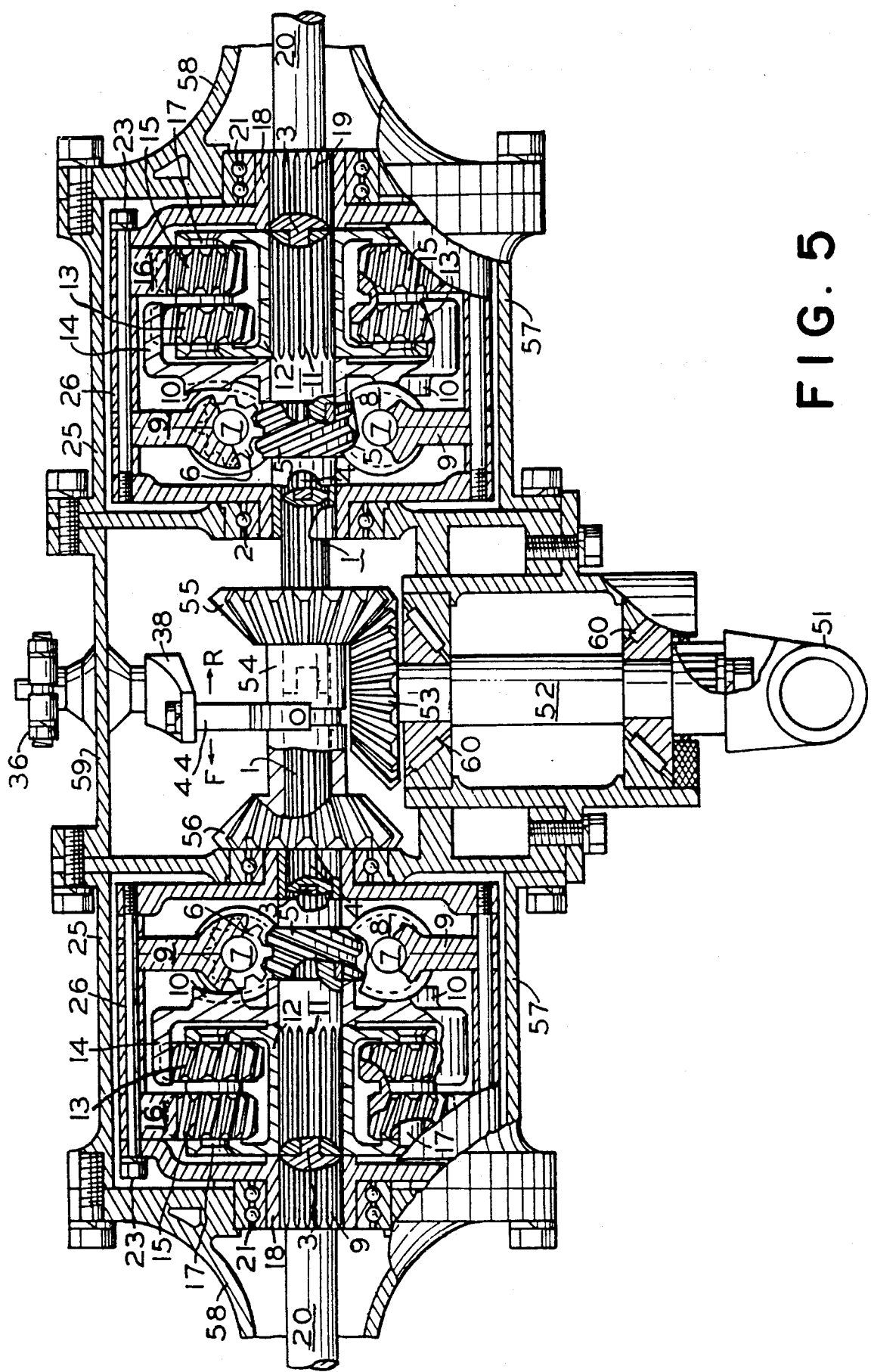
FIG. 5 is an operational top view of a transaxle using two torque impellers.

FIG. 5 shows two torque impellers in use as a transaxle. They are driven through universal yoke 51 and long drive pinion shaft 52 and associated pinion gear 53 which meshes with forward side gear 55 and with reverse side gear 56. They are splined to input shaft 1 along with the forward, neutral, reverse coupling gear assembly 54 and placed into gear via the gear control selector 36 and gear shifter fork 44. Other type gear arrangements may of course be preferred, such as forward location for the gear selector.

In the transaxle version this invention has a distinct advantage over all others. Positive and absolute traction is achieved at all times from each drive wheel and eliminates the need for a differential gear. It can also be tandomed easily and can be used full time in, "four wheel", front and rear wheel drives under every type of drawing condition. There is very little power lost since there are no housing attachments, such as pumps, disc type clutches or bands. Even though there is only a single drive shaft driving both sides of the transaxle, each side is independent from the other and can operate on a different motor to drive wheel ratio. As for example, one drive wheel could sit on ice or be suspended in the air while the other could perform normally. This of course allows it to operate very well around corners and sharp turns. Table #2 below outlines the performance of a 100 HP vehicular motor using torque impellers in a transaxle at fixed drive-wheel RPM's while driving at a leisurely pace. For comparison, Table #3 outlines performance of the same vehicle while driving at the extreme, such as in an auto race.

TABLE NUMBER 2

| 100 HP MOTOR-6000 RPM MAX. POWER - TORQUE ImpellerS = 75 TO 1 RATIO | | | | | | |
|---|---|---|---|---|---|---|
| ESTIMATED % POWER APPLIED | 6000 RPM MAXIMUM MOTOR RPM | POSITIVE MOTOR TO DR. WHEEL GEAR RAT. | APPROX. AXLE HP @ 95% | AXLE 20 ANNULUS GEAR 16 RPM | MILES PER HOUR | K.M. PER HOUR |
| 10% | 600 | 40-1 | 380 | 15 | 1.17 | 1.9 |
| 13.3% | 800 | 16-1 | 202 | 50 | 3.9 | 6.3 |
| 20% | 1200 | 12-1 | 228 | 100 | 7.8 | 12.6 |
| 30% | 1800 | 9-1 | 256 | 200 | 15.6 | 25.3 |
| 40% | 2400 | 6-1 | 228 | 400 | 31.2 | 50.5 |
| 33% | 2000 | 3.3-1 | 104 | 600 | 46.8 | 75.8 |
| 26.6% | 1600 | 2-1 | 50 | 800 | 62.4 | 101.1 |
| 16.6% | 1000 | 1-1 | 16 | 1000 | 78 | 126.5 |

TABLE NUMBER 3

| SAME CONDITIONS AS ABOVE - MAXIMUM POWER APPLIED | | | | | | |
|---|---|---|---|---|---|---|
| 19% | 1125 | 75-1 | 1354 | 15 | 1.17 | 1.9 |
| 62% | 3750 | 75-1 | 4417 | 50 | 3.9 | 6.3 |
| 83% | 5000 | 50-1 | 3942 | 100 | 7.8 | 12.6 |
| 100% | 6000 | 30-1 | 2850 | 200 | 15.6 | 25.3 |

TABLE NUMBER 3-continued

| SAME CONDITIONS AS ABOVE - MAXIMUM POWER APPLIED | | | | | | |
|---|---|---|---|---|---|---|
| 100% | 6000 | 15–1 | 1425 | 400 | 31.2 | 50.5 |
| 100% | 6000 | 10–1 | 950 | 600 | 46.8 | 75.8 |
| 100% | 6000 | 7.5–1 | 712 | 800 | 62.4 | 101.1 |
| 100% | 6000 | 6–1 | 570 | 1000 | 78 | 126.5 |

Indications are that a 100 HP motor in series with a torque impeller of this invention or a transaxle having such torque impellers, will deliver more axle horse power up to 10 MPH if needed and approximately as much axle power up to 30 or 35 MPH as a motor 3 times larger than the above and having a conventional transmission. Line 5 in Table 2 is in reference to a motor having a drive wheel ratio of 6 to 1, an axle horsepower rating of 228 and a speed of 31.2 MPH or 50.5 KMPH. Line 5 in Table 3 shows a motor speed of 6000 RPM with a 15 to 1 motor to drive wheel ratio, an axle rating of 1425 HP and the same speed as in Table 2. By increasing the engine speed from 2400 RPM to 6000 RPM at 31+− MPH, an additional 1197 HP is applied to the drive wheels which would indicate that the torque impeller of this invention could leap from a 6 to 1 ratio to a 15 to 1 ratio and develop more than enough power for passing other vehicles and with a small economic motor. It would have the ability to accelerate rapidly from a standstill to 50 or more MPH if needed and still have the ability to conserve a considerable amount of fuel. This is accomplished without shifting gears, yet a constant and infinite change in gear ratios take place until an optimum ratio is obtained, matching the motor capability to the load.

For large trucks, buses or vehicles of that type, a simple forward-neutral-reverse beefed up gear box may be used in the usual location, adjacent to the clutch and motor, to drive a beefed up transaxle similar to FIG. 5. In lieu of pinion gear 53, driving forward and reverse side gears 55 and 56, it could instead drive a larger fixed side gear to drive the axle or input shaft 1, having for example an approximate 5 to 1 ratio. If the transaxle torque impellers were designed with a low gear ratio of approximately 30 to 1, together they would provide a motor to drive wheel low gear ratio of approximately 150 to 1 at start-up and an approximate 5 to 1 ratio for high gear. Braking the vehicle and slowing it down would automatically place the torque impellers in a low gear mode.

Due to the extremely low ratios obtainable with the torque impeller, it lends itself very well to the electric propulsion of vehicles. In reference to FIG. 5, if universal yoke 51 and associated parts plus the forward, reverse, neutral gear assembly 54–56 were replaced with a double shafted reversible electric motor, a transaxle having considerable power is made possible, especially at start-up. In addition, for added power at start-up, an additional torque impeller can be added on each end making a total of 2 on each side of the transaxle. This will make extremely low gears possible. Also the electric motor could be located elsewhere with the driveshaft driving universal yoke 51, however, neutral, forward and reverse gears would be unnecessary since the electric motor itself will provide those features. This would require three torque impellers instead of 4 and provide essentially the same performance.

Table #4 shows what effect an in series, reversible electric powered transaxle would have on a small vehicle designed for local driving. As for example some golf carts are powered by 2800 RPM —3 HP electric motors having a fixed gear ratio of approximately 140 to 1 developing 415 HP and a top speed of 12 MPH.

TABLE NUMBER 4

| 600 RPM 6 HP ELECTRIC MOTOR - TORQUE ImpellerS = 300 TO 1 RATIO | | | | | | |
|---|---|---|---|---|---|---|
| ESTIMATED % POWER APPLIED | 600 RPM MAXIMUM MOTOR RPM | POSITIVE MOTOR TO DR. WHEEL GEAR RAT. | APPROX. AXLE HP @ 95% | DRIVE WHEEL AXLE RPM | MILES PER HOUR | K.M. PER HOUR |
| 75% | 4500 | 300–1 | 1282 | 15 | 1.17 | 1.9 |
| 100% | 6000 | 120–1 | 684 | 50 | 3.9 | 6.3 |
| 100% | 6000 | 60 | 342 | 100 | 7.8 | 12.6 |
| 100% | 6000 | 30 | 171 | 200 | 15.6 | 25.3 |
| 100% | 6000 | 15 | 86 | 400 | 31.2 | 50.5 |
| 100% | 6000 | 10 | 57 | 600 | 46.8 | 75.8 |
| 100% | 6000 | 7.5 | 43 | 800 | 62.4 | 101.1 |

It is apparent from the above table that a medium sized battery operated vehicle having a transaxle with torque impellers would do well in keeping up with other vehicular traffic for average city driving. Such a vehicle could have a battery operated electric motor and transaxle for local driving and the other transaxle powered by a larger electric motor and a power driven alternator, or powered directly by the auto power plant for the long haul. The transaxle and associated torque impeller will provide options in every mode of travel not here-to-fore available.

The trans-planetary torque impeller of this invention may be made as small as 3 or 3.5 inches, (80 or 90 MM) in diameter for a bicycle, or smaller for other possible uses. It has no size limitation for the large jobs and unmatched in its versatility. This unique, self-help, simple, totally gear driven mechanism utilizes an output shaft load feedback arrangement and unmatched siamese twin planetary gears with associated annulus gears to perform a new function in the torque delivery of this invention which is not believed to have been accomplished in prior art.

The torque impeller of this invention is the key to use of smaller motors in the industrial and transportation fields and very likely is the fore-runner of successful electric powered vehicles of the future. Its impact on the environment should be highly favorable since fuel consumption should be greatly reduced in the field of transportation in particular.

PARTS LIST

1. Input shaft
2. Input shaft bearing
3. Output shaft extension stabilizer
4. Worm gear spline
5. Primary worm gear
6. Pinion worm gear
7. Pinion worm gear axle
8. Secondary worm gear
9. Worm carrier
10. Control worm gear
11. Input planetary carrier spline
12. Planetary carrier
13. Primary planetary pinion gear
14. Primary annulus gear
15. Secondary planetary pinion gear
16. Secondary annulus gear
17. Planetary axle
18. Output shaft end plate
19. Output shaft spline
20. Output shaft
21. Output shaft bearing
22. End plate
23. Inner housing assembly bolt
24. Outer housing assembly bolt
25. Outer housing
26. Inner housing
27. Outer front end plate
28. Lubricant fill plus
29. Lubricant drain plug
30. Base
31. Inner front end plate
32. Speedometer gear
33. Speedometer drive gear
34. Universal joint flange
35. Clutch or torque converter cover
36. Gear control selector
37. Gear box cover
38. Inner shifter lever
39. (Clutch) (torque converter) output shaft
40. Forward coupling gear
41. Forward coupling gear
42. Forward spline
43. Forward outer spline
44. Shifter form
45. Reverse outer spline
46. Reverse spline
47. Reverse coupling gear
48. Reverse pinion gear
49. Pinion axle
50. Gear box pan
51. Universal yoke
52. Long drive pinion
53. Pinion gear
54. Forward-neutral-reverse coupling gear assembly
55. Forward side gear
56. Reverse side gear
57. Transaxle housing
58. Axle housing
59. Gear box housing
60. Roller bearings

What is claimed is:

1. A mechanical torque impellor capable of infinitely responding to changing load conditions while providing specific low input to output rations at start-up, said torque impellor comprising:

a rotatable input shaft;

a planetary carrier supported on and rotatable with said input shaft;

at least two sets of joined input planetary pinion gears rotatably supported by said planetary carrier, a first, primary planetary pinion gear in each of said sets of joined input planetary pinion gears being larger in circumference than an adjoining second, secondary planetary pinion gear;

a primary annulus gear supported on and rotatable with respect to said input shaft, said at least two sets of joined input planetary pinion gears revolving in union and when revolved by said input shaft causing said primary planetary pinion gears too mesh and planetarily revolve within said primary annulus gear;

an output shaft rotatably supported in said mechanical torque impellor;

a secondary annulus gear supported by said output shaft and driving said output shaft in response to rotation of said input shaft, said secondary planetary pinion gears in said at least two sets of joined input planetary gears meshing with and planetarily revolving within said secondary annulus gear;

at least a first worm carrier supported by and rotatable with said secondary annulus gear;

at least a first set of a joined pinion worm gear and a secondary worm gear rotatably supported by said worm carrier, said pinion worm gear being in meshing engagement with a primary worm gear secured to said input shaft and said secondary worm gear being in meshing engagement with a control worm gear formed on said primary annular gear whereby for each revolution of said input shaft and said primary planetary pinion gear at start-up, said secondary annulus gear will be pulled the equivalent distance of the difference in circumference between said primary planetary pinion gears and said secondary planetary pinion gears, thereby causing said secondary annulus gear to revolve slower than said input shaft at start-up and under load conditions and to infinitely and continually seek a 1 to 1 ratio as said input shaft speed increases and as the load through speedup decreases.

2. The torque impeller as in claim 1 wherein said attached primary and secondary planetary pinion gears and said individual associated annulus gears govern the obtainable designed start-up low gear ratio by a difference in size in which a larger difference between said primary gears and said secondary gears is required to obtain a small difference in gear ratio and wherein a small difference in size between said primary gears and the secondary gears produce a larger gear ratio which will require more input shaft revolutions to obtain a smaller number of secondary annulus gear revolutions at start-up.

3. The torque impeller as in claim 1 wherein a control worm gear and an associated primary annulus gear are held approximately stationary at start-up to effect a base for the primary planetary gears, wherein said annulus gear is made to rotate slower than said secondary annulus gear through exacting rotation of said worm gear thereby creating a controlled and proper progressive lag between the primary gears and secondary gears at all times or until such times that the entire impeller revolves in a 1 to 1 ratio.

4. The torque impeller as in claim 3 whereby a primary worm gear is splined and is attached to make a part of the input shaft and rotatably intermeshes and revolves at least two pinion worm gears having a specific number of teeth which are associated with a like number of secondary worm gears intermesh with a single control worm gear attached to said primary annulus gear thereby creating a reverse holding action on said primary annulus gear equivalent in worm gear ratio to the designed primary planetary gear versus secondary planetary gear ratio all of which is responsive to variable rotation of the input shaft and primary worm gear.

5. The torque impeller as in claim 4 wherein the primary annulus gear thrust placed on the control worm gear using it as a base to drive the secondary annulus gear, through the primary planetary gear, is indirectly applied to the output shaft through the worm gears and worm carrier thereby using the output shaft load itself to help drive the output shaft and assist in matching the motor driving it to the load.

6. The torque impeller as in claim 1 wherein said output shaft is useable when used in a transaxle and will respond when operating on the inside of a curve by revolving slower than the axle on the outside curve thereby causing a slight orbital slowdown of the secondary annulus gear plus associated worm carrier causing a corresponding slowdown of the associated primary annulus gear which will allow continued rotation of the planetary carrier and increased axial rotation of the primary and secondary planetary pinion gears resulting in a slightly lower gear ratio for the wheel on inside curve while allowing torque to be applied to both wheels at all times.

7. The torque impeller as in claim 6 wherein said output shaft, when used in a transaxle, will respond when used on the outside of curve or radius, during such time that the drivewheel and axle on the inside curve or radius is operating in a maximum low gear condition, will revolve slightly faster thereby causing the secondary annulus gear and associated worm carrier to also revolve more rapidly along with the associated primary annulus gear thereby allowing the torque impeller and respective drivewheel on the outside curve to revolve more rapidly at a higher ratio than the one on the inside curve.

8. The torque impeller as in claim 6 wherein the output shafts are connected to drive wheels on a vehicle having brakes which when applied will cause a slowdown of the secondary annulus gear and associated worm carrier which will also cause a slowdown of the primary planetary gears making the torque impeller go into low gear correspondingly which uses the combustion engine compression to help slow the vehicle at all stops providing an engaged clutch is in operation.

9. The torque impeller as in claim 1 wherein a first torque impeller is used to drive a second torque impeller to reduce planetary rotation of said second unit thereby greatly increasing said input shaft to said output shaft ratios at start-up.

10. The torque impeller as in claim 1 whereby the greater the load on the output shaft the greater the pull on the secondary annulus gear thereby affecting like feedback thrust on the primary annulus gear, worm carrier and output shaft causing corresponding planetary gear rotation relative to the load involved, all of which is rotatably dictated by the ability or the amount of power available to revolve it wherein all of the above is capable of lengthy operation at any given ratio and will operate infinitely while striving continually to reach a 1 to 1 ratio while matching the motor to the load.

* * * * *

UNITED STATES PATENT AND TRADEMARK OFFICE
CERTIFICATE OF CORRECTION

PATENT NO. : 5,059,163

DATED : October 22, 1991

INVENTOR(S) : John W. von Greyerz

It is certified that error appears in the above-identified patent and that said Letters Patent is hereby corrected as shown below:

Column 4, line 46, after "14C." insert--Planetary gears 15 when revolved 2 likewise revolutions would--.

Column 7, line 10, after "Fig." insert --1--.

Column 11, line 64, after "torque" cancel "impellor" and substitute --impeller--;

Line 66, after "output" cancel "rations" and substitute --ratios--; and

Line 67, after "torque" cancel "impellor" and substitute --impeller--.

Column 12, line 13, after "gears" cancel "too" and substitute --to--; and

Line 17, after "torque" cancel "impellor" and substitute --impeller--.

Signed and Sealed this

Thirteenth Day of April, 1993

*Attest:*

STEPHEN G. KUNIN

*Attesting Officer*   *Acting Commissioner of Patents and Trademarks*